(12) United States Patent
Chao

(10) Patent No.: US 6,929,277 B2
(45) Date of Patent: Aug. 16, 2005

(54) BREAK APART BICYCLE

(76) Inventor: Hung-Chang Chao, 6F, No. 21, Alley 29, Lane 372, Section 5, Chung-Shiao East Road, Taipei (TW)

( * ) Notice: Subject to any disclaimer, the term of this patent is extended or adjusted under 35 U.S.C. 154(b) by 0 days.

(21) Appl. No.: 10/617,786

(22) Filed: Jul. 14, 2003

(65) Prior Publication Data

US 2004/0007851 A1 Jan. 15, 2004

(30) Foreign Application Priority Data

Jul. 15, 2002 (TW) .................................. 91210758 U

(51) Int. Cl.[7] .............................................. B62K 1/00
(52) U.S. Cl. ...................................... 280/278; 280/287
(58) Field of Search ................................ 280/278, 287, 280/281.1

(56) References Cited

U.S. PATENT DOCUMENTS

| 1,427,402 | A | * | 8/1922 | Malec | 403/342 |
| 4,252,335 | A | * | 2/1981 | Brenner | 280/287 |
| 4,441,729 | A | * | 4/1984 | Underwood | 280/278 |
| 5,222,751 | A | * | 6/1993 | Chen | 280/278 |
| 5,419,574 | A | * | 5/1995 | Krumm | 280/278 |
| 5,431,507 | A | * | 7/1995 | Smilanick | 403/307 |
| 5,975,551 | A | * | 11/1999 | Montague et al. | 280/287 |
| 2002/0140203 | A1 | * | 10/2002 | Chen | 280/287 |
| 2003/0080531 | A1 | * | 5/2003 | Ritchey | 280/281.1 |

FOREIGN PATENT DOCUMENTS

DE          4237864          *    5/1994

* cited by examiner

Primary Examiner—Anne Marie Boehler
(74) Attorney, Agent, or Firm—Bacon & Thomas

(57) ABSTRACT

A detachable bicycle comprises a front frame section including a joint tube at a rear end of the crossbar, a rear frame section including a sleeve extended forward, obliquely from the bottom bracket for receiving a lower portion of the down tube, and a seat tube extended upward from the bottom bracket of the joint tube wherein the seat tube is substantially perpendicular with respect to the down tube, and a seat post inserted through the joint tube and into the seat tube. The seat post and the seat tube are secured to the joint tube by two quick releases. The down tube is also secured to the sleeve by a quick release.

4 Claims, 7 Drawing Sheets

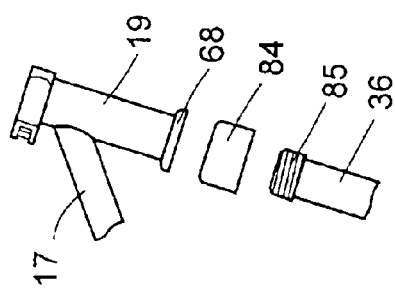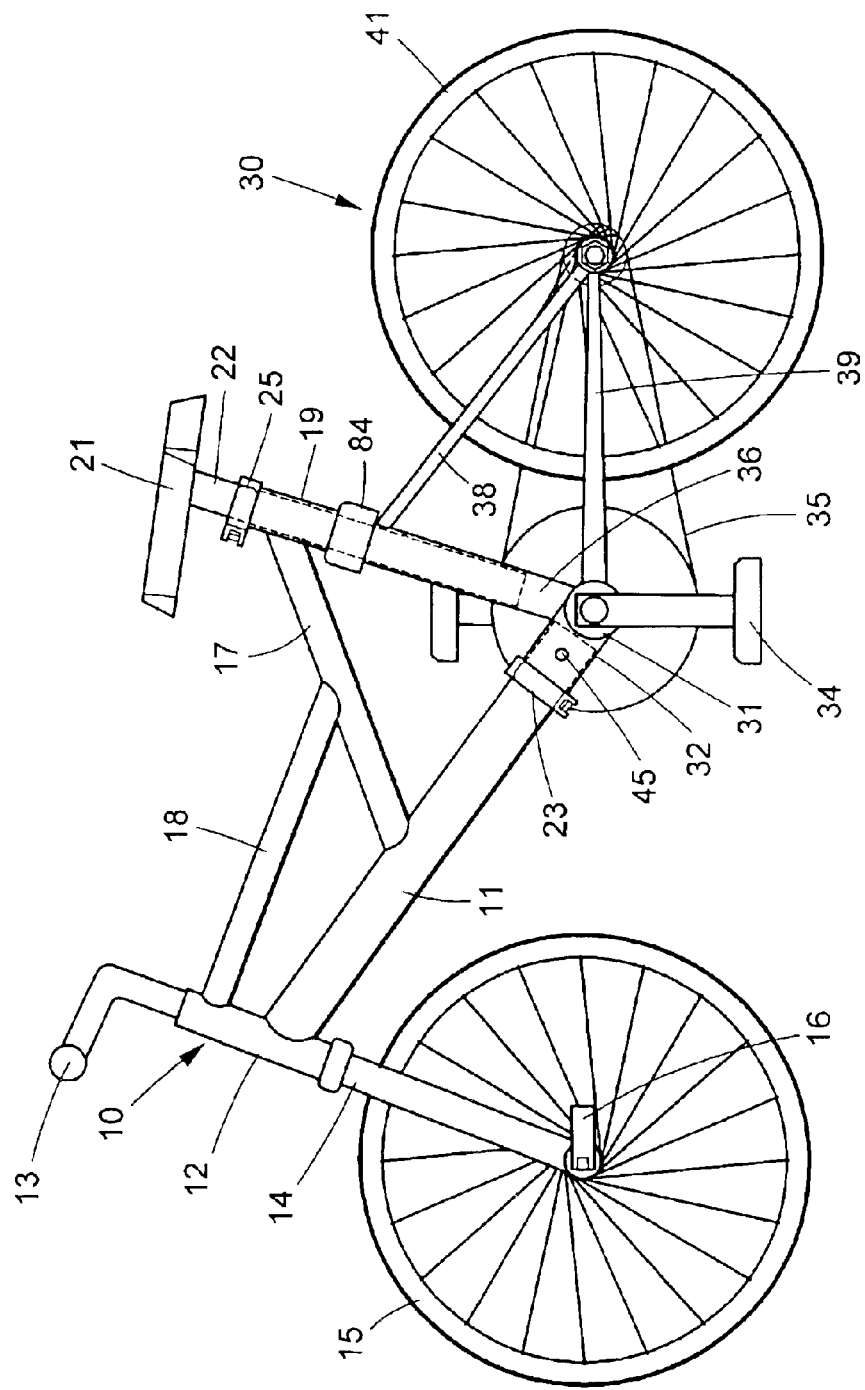

BREAK APART BICYCLE

BACKGROUND OF THE INVENTION

1. Field of the Invention

The present invention relates to bicycles and more particularly to a bicycle featured a detachable frame with improved characteristics.

2. Description of the Prior Art

Conventionally, bicycles can be classified as ones featured a fixed frame and ones featured a foldable frame (e.g., folding bicycles). For the former, they are superior in a strong structure and less restrictions imposed on designs. For example, bicycles featured a popular rhombic frame are made possible. But they are also inferior for occupying space in delivery and/or storage. This is particularly true for electric bicycles. Nowadays, many cars have a rack for fastening a bicycle thereon so that a driver can carry the bicycle while going for an outing. However, the fastening process is tedious. Further, it may adversely affect safety while driving.

For the latter (i.e., folding bicycles), they are superior in saving space in delivery and/or storage. They are particularly suitable for being carried by cars for outings. But they are also inferior for being structurally weak because a potential break may occur at the folded portions of the bicycle. For overcoming such problem, reinforcement is added at the folded portions. Unfortunately, such reinforcement may detract the bicycle's appearance because many restrictions may be imposed on the design of bicycle due to the provision of releasable fastening devices (e.g., snap members, ring fasteners or the like) thereon. As a result, only a few types of folding bicycles are popular in the market. Further, some folding bicycles even have an increased width after folded. This can compromise the desired purpose of saving space in delivery and/or storage. Thus, the need for improvement still exists.

SUMMARY OF THE INVENTION

It is an object of the present invention to provide a break apart bicycle which can be assembled in two substantially opposite, vertical directions. The formed bicycle is as strong as a typical bicycle featured a fixed frame.

It is another object of the present invention to provide a break apart bicycle which can be quickly detached into at least two portions or assembled together in a do-it-yourself manner.

It is still another object of the present invention to provide a break apart bicycle in which detached components thereof can be tightly packed together so as to save storage space while going for an outing by driving a car.

It is yet another object of the present invention to provide a break apart bicycle in which no restrictions are imposed on designs for preserving the bicycle's appearance the same as that of a typical bicycle featured a fixed frame. Also, the bicycle can be implemented as one of a variety of bicycles such as bicycles featured a rhombic frame or Y frame, or lady bicycles.

It is a further another object of the present invention to provide a break apart bicycle which material used for packing the bicycle can be reduced up to 60 further. Thus, cost related to delivery, storage borne on the manufacturer is significantly reduced.

To achieve the above and other objects, the present invention provide a break apart bicycle, comprising a front frame section comprising a head tube, a fork, two handlebars, a front wheel releasably coupled to the fork, a crossbar, a down tube extended rearward, obliquely from the head tube, and a joint tube at a rear end of the crossbar; a rear frame section comprising two foot pedals, a sprocket wheel, a bottom bracket coupled to the foot pedals and a front axle of the sprocket wheel, a chain stay extended rearward from the bottom bracket to an axle of a rear wheel, a seat stay having a rear end coupled to the axle of the rear wheel, a sleeve extended forward, obliquely from the bottom bracket for receiving a lower portion of the down tube, and a seat tube extended upward from the bottom bracket to have its upper portion inserted into the joint tube wherein the seat tube is substantially perpendicular with respect to the down tube; and a seat post inserted through the joint tube into the seat tube, the seat post having a top saddle, wherein the seat post and the seat tube are secured to the joint tube by means of a first quick release and a second quick release respectively, and the down tube is secured to the sleeve by means of a third quick release.

BRIEF DESCRIPTION OF THE DRAWINGS

The drawings disclose an illustrative embodiment of the present invention which serves to exemplify the various advantages and objects hereof, and are as follow:

FIG. 7 is a perspective view of a second preferred embodiment of break apart bicycle according to the invention; and FIG. 8 is an exploded view of one of detachable portions of the bicycle shown in FIG. 7.

DETAILED DESCRIPTION OF THE INVENTION

Figure 1:
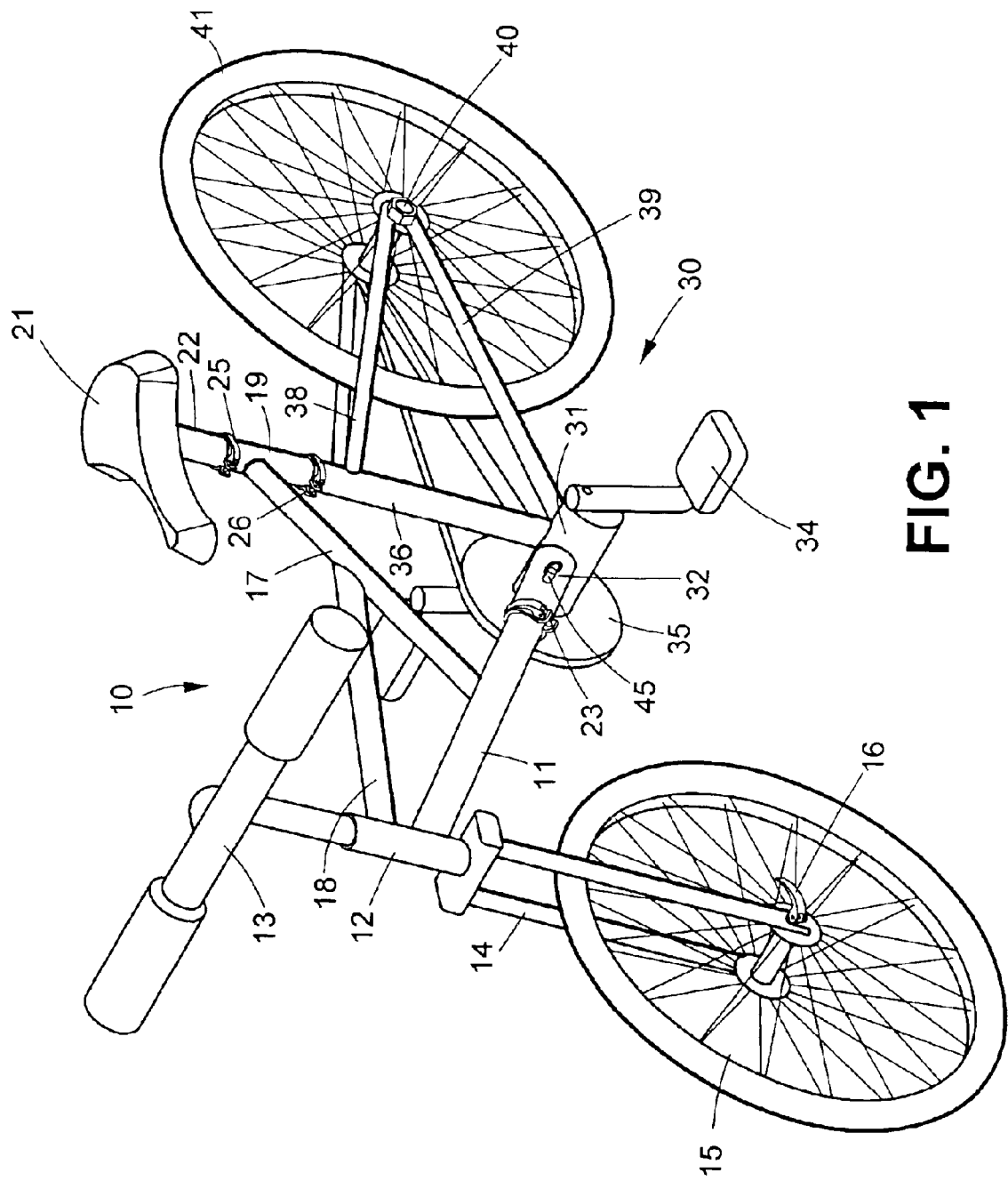
FIG. 1 is a perspective view of a first preferred embodiment of break apart bicycle according to the invention.
Figure 2:
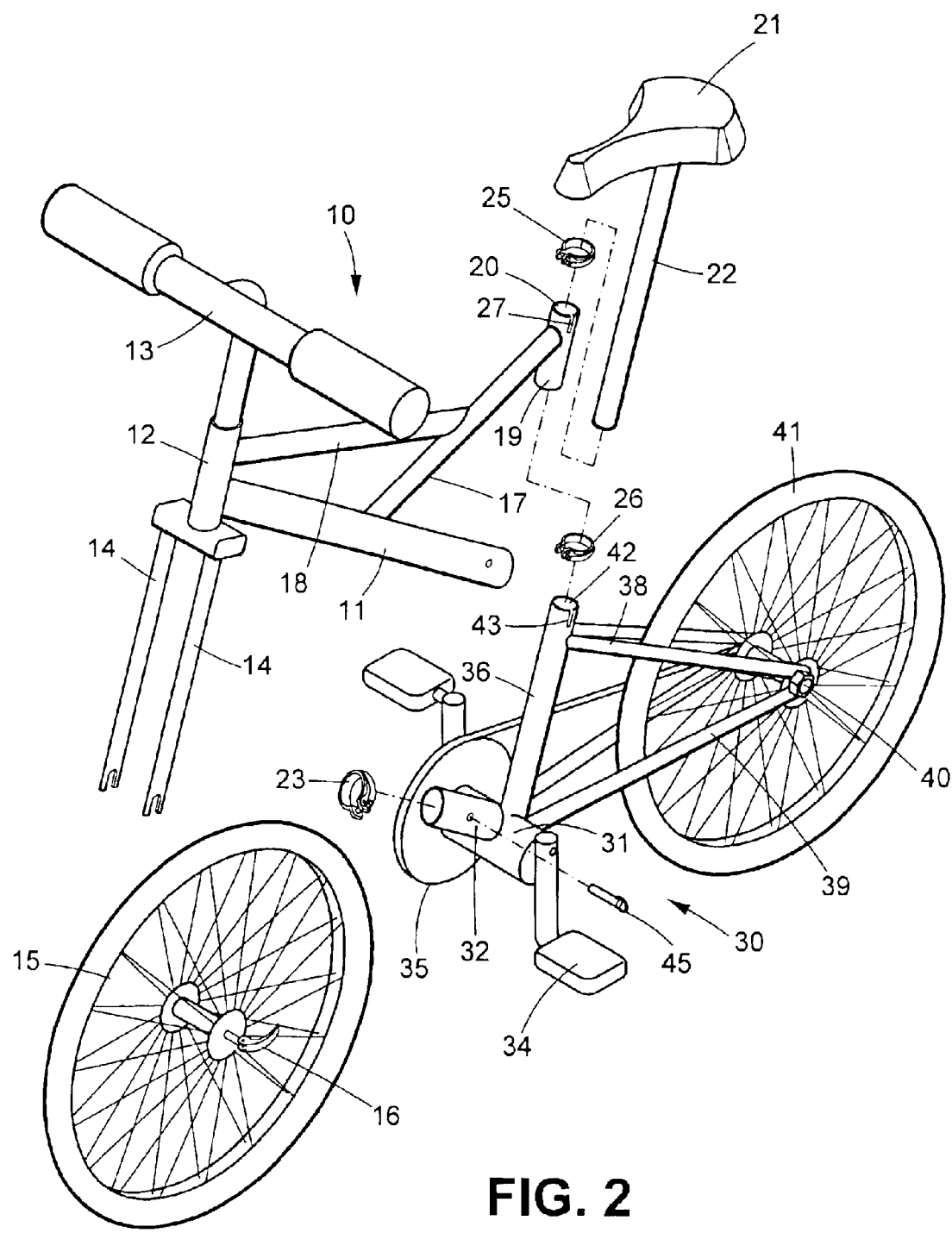
FIG. 2 is an exploded view of the bicycle.
Figure 3:
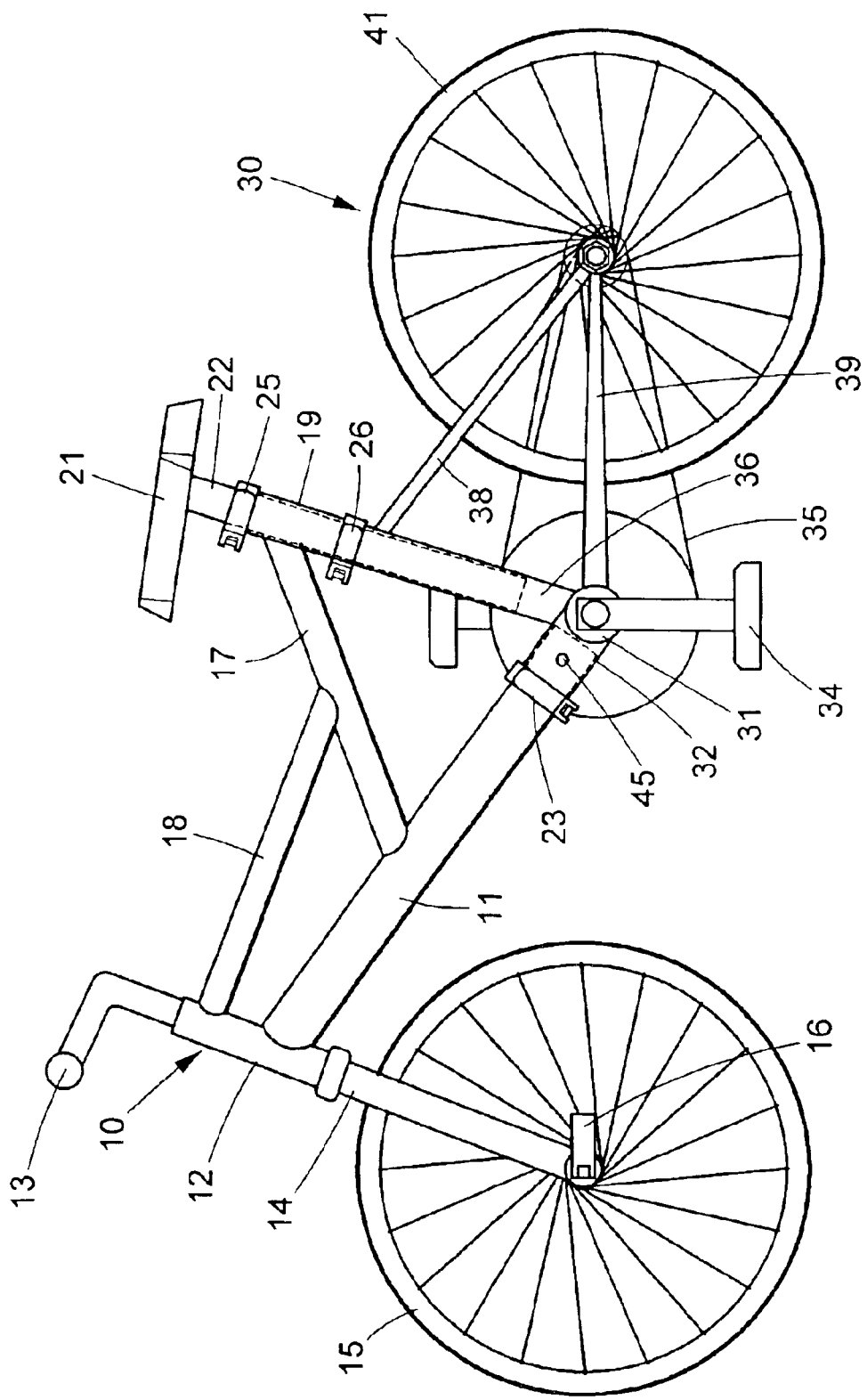
FIG. 3 is a side elevational view of the bicycle shown in FIG. 1.
Figure 4:
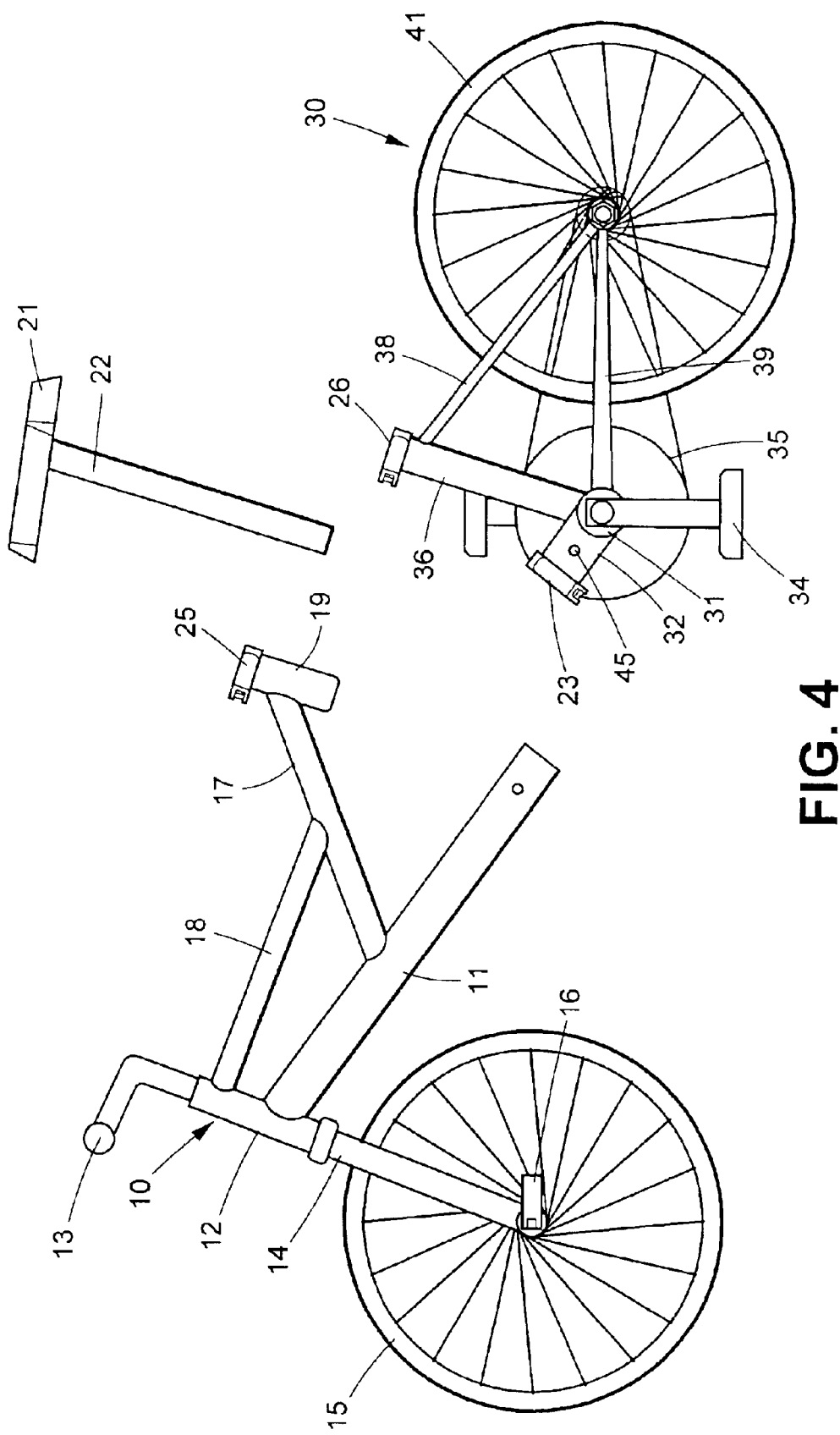
FIG. 4 is an exploded view of the bicycle shown in FIG. 3.

Referring to FIGS. 1 to 4, a break apart bicycle constructed in accordance with a first preferred embodiment of the invention is shown. Each component of the bicycle will be described in detail below. The bicycle comprises a front frame section 10 and a rear frame section 30 adapted to assemble with the front frame section 10. The front frame section 10 comprises a head tube 12, a fork 14, handlebars 13, a front wheel 15 releasably coupled to the fork 14 by mean of a first quick release 16, a first crossbar 17, a second crossbar 18, and a down tube 11 extended rearward from the head tube 12 to be adapted to connect to a sleeve 32 formed obliquely at a forward side of a bottom bracket 31 which is formed on the rear frame section 30 by welding in which a second quick release 23 is used to fasten the down tube 11 and the sleeve 32 together as detailed later. A joint tube 19, is connectable to a seat post 22 and a seat tube 36 by means of third and fourth quick releases, 25 and 26 respectively, thereby forming a complete seat tube. A saddle 21 is mounted on the seat post 22. The seat tube 36 is extended upward from the bottom bracket 31. Note that the down tube 11 is substantially perpendicular with respect to the seat tubes 22 and 36. This has a benefit of increasing the structural strength of the assembled bicycle. Further, a disassembly of the above detachable components (e.g., the down tube 11, the seat post 22 and seat tube 36, and the front wheel 15) is obvious to those skilled in the art. Thus a detailed description thereof is omitted herein for the sake of brevity. It is seen that the bicycle components can be put together compactly so as to save storage space, for example while going for an outing by driving a car.

The first crossbar 17 is coupled to about an intermediate portion of the down tube 11 by welding. The second crossbar 18, as reinforcement, is coupled between the first crossbar 17 and the head tube 12. The joint tube 19 is at the rear end of the first crossbar 17. Also, at least one longitudinal slit 27 is formed at an upper end 20 of the joint tube 19 for permitting the upper end 20 of the joint tube 19 to slightly deform for receiving and fastening the seat post 22 by means of the third quick release 25. Likewise, at least one longitudinal slit 43 is formed at an upper end 42 of the seat tube 36 for permitting the upper end 42 of the seat tube 36 to slightly deform for receiving and fastening the joint tube 19 by means of the fourth quick release 26.

The bottom bracket 31 is provided to permit a pair of pedals 34 and a sprocket wheel 35 to connect thereto. The rear frame section 30 further comprises a chain stay 39 extended rearward from the bottom bracket 31, and a seat stay 38 extended upwardly, obliquely from axle of a rear wheel 41 to couple to the seat tube 36. The chain stay 39, the seat stay 38, and the seat tube 36 together form a seat stay assembly. The seat stay assembly together with the pedals 34, the sprocket wheel 35, and the bottom bracket 31 form a transmission mechanism of the rear frame section 30.

Figure 5:
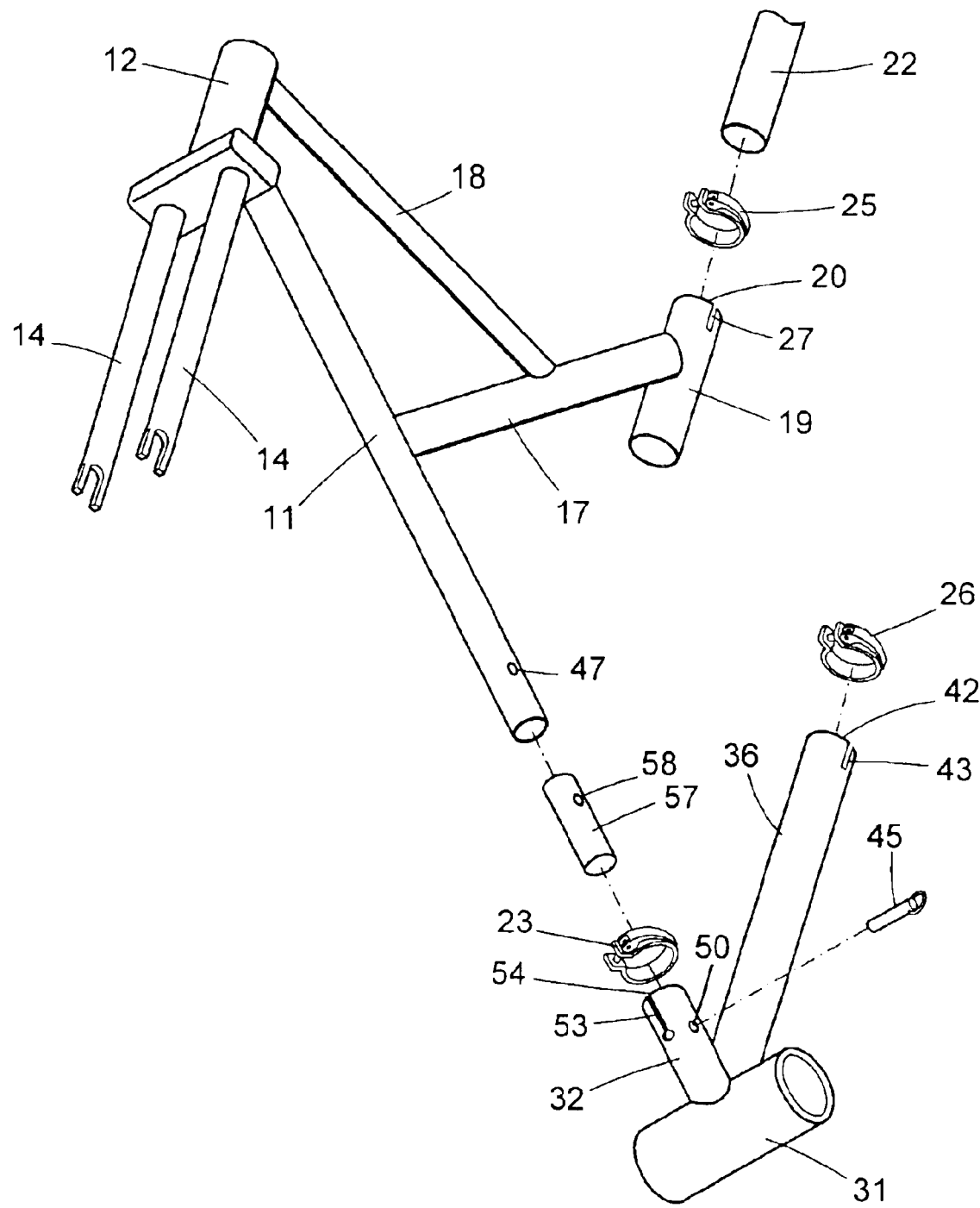
FIG. 5 is a detailed view of the detached portions of the bicycle shown in FIG. 2.

Referring to FIG. 5, a safety pin 45 is adapted to insert through an aperture 50 of the sleeve 32, an aperture 47 proximate a lower end of the down tube 11, and an aperture 58 of a solid, reinforced cylinder 57 for fastening the down tube 11 and the sleeve 32 together. The cylinder 57 is inserted into the lower end of the down tube 11. Also, the aperture 58 is provided to facilitate a user to quickly insert the safety pin 45 in place even in a dark environment. Also, at least one longitudinal slit 53 is formed at an upper end 54 of the sleeve 32 for permitting the upper end 54 of the sleeve 32 to slightly deform for fastening the down tube 11 by means of the second quick release 23. Note that the quick release is a well-known device. The quick release can be replaced by any fastener such as a bolt and nut combination, clamp, ring fastener, snap fastener, or the like in any of other embodiments without departing from the scope and spirit of the invention as long as the purpose of quick assembly or disassembly of the bicycle is not compromised.

Figure 6:
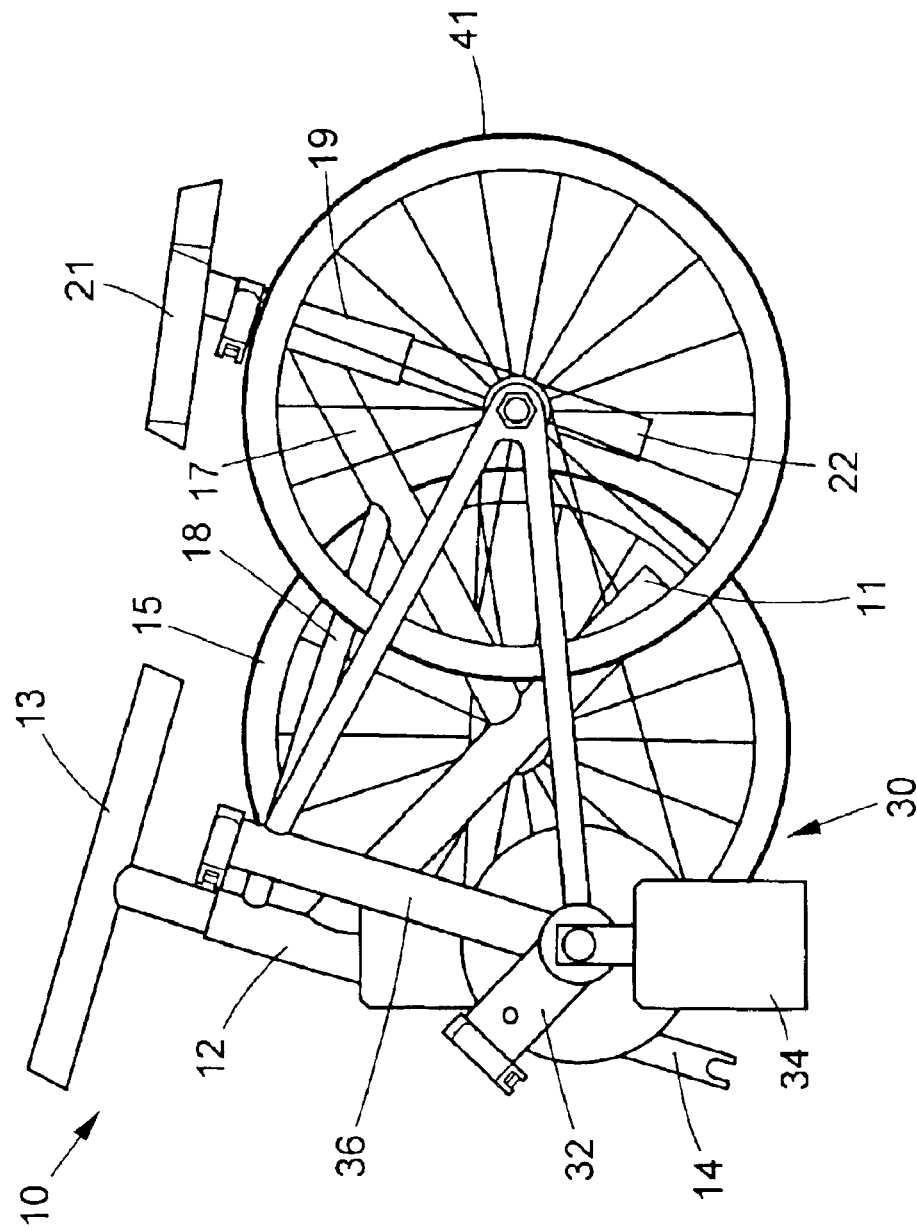
FIG. 6 is a side elevational view of the detached bicycle stored in a compact manner for facilitating storage, delivery, or outing.

Referring to FIG. 6, there is shown the detached bicycle stored in a compact manner for facilitating storage, delivery, or outing. In detail, the front frame section 10, the rear frame section 30, and even the front wheel 15 are detached. Also, the handlebars 13 and the fork 14 are turned about 90 degrees to be parallel with the down tube 11, the first crossbar 17, and the second crossbar 18. Further, the detached seat post 22 is again inserted into the joint tube 19 at a lowest position with the seat 21 mounted on the seat post 22. Furthermore, one (or more) of the detached front frame section 10, the rear frame section 30, the front wheel 15, and the seat post 22 is (or are) inserted into gaps of the bicycle in a storage state or put together compactly for saving storage space. Alternatively, one (or more) of the detached front frame section 10, the rear frame section 30, the front wheel 15, and the seat post 22 is (or are) packed by a large bag. Preferably, material for packing the detached bicycle can be further reduced. Thus, cost related to storage or delivery borne on the manufacturer is significantly reduced. Moreover, the invention is beneficial for being easy in assembly or disassembly in which skill is not important in assembling or detaching the bicycle in any place any time. In other words, the assembly or disassembly of the bicycle can be done in a do-it-yourself manner.

Referring to FIGS. 7 and 8, a second preferred embodiment of the invention is illustrated. The second preferred embodiment substantially has same structure as the first preferred embodiment. The differences between the first and the second preferred embodiments, i.e., the characteristics of the second preferred embodiment are detailed below. A waterproof union nut 84 is used in place of the fourth quick release 26. The union nut 84 comprises an internal threaded section. Also, an external threaded section 85 is formed at a top end of the seat tube 36. The union nut 84 is thus secured to the seat tube 36 by threadedly coupling the internal threaded section thereof to the external threaded section 85 of the seat tube 36. Moreover, an annular flange 68 is formed at a lower end of the joint tube 19 for securing to the union nut 84 by snapping. As an end, the joint tube 19 and the seat tube 36 are fastened together by the union nut 84. The union nut 84 also has the benefit of preventing rain from falling into the seat tube 36.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A break apart bicycle comprising:
   (a) a front frame section including a head tube, a fork, two handle bars, a front wheel releasably coupled to the fork by a first quick release, a crossbar, a down tube extending rearwardly and obliquely from the head tube, and a joint tube at a rear end of the crossbar;
   (b) a rear frame section including two foot pedals, a sprocket wheel having a front axle, a bottom bracket coupled to the foot pedals and front axle of the sprocket wheel, and a chain stay extending rearwardly from the bottom bracket to an axle of a rear wheel;
   (c) a sleeve extending forwardly and obliquely from the bottom bracket, the sleeve having an upper end for receiving a lower portion of the down tube therein, the sleeve including at least one longitudinal slit at the upper end thereof and a second quick release for coupling the lower portion of the down tube within the upper end of the sleeve by temporarily deforming the at least one longitudinal slit;
   (d) a seat post having a top saddle at an upper portion thereof and a lower portion, the joint tube including an upper end provided with at least one longitudinal slot for receiving the lower portion of the seat post therein, a third quick release for coupling the lower portion of the seat post to the upper end of the joint tube by temporarily deforming the at least one longitudinal slit; and
   (e) a seat tube extending upwardly from the bottom bracket and having an upper end provided with at least one longitudinal slit for receiving a lower portion of the joint tube therein, and a fourth quick release for coupling the lower portion of the joint tube within the upper end of the seat tube by temporarily deforming the at least one longitudinal slit.

2. The break apart bicycle of claim 1 wherein each of the sleeve and down tubes includes a radial aperture formed therein, and further including a safety pin insertable through the radial apertures for securing the sleeve and down tubes together.

3. A break apart bicycle comprising:
(a) a front frame section including a head tube, a fork, two handle bars, a front wheel releasably coupled to the fork by a first quick release, a crossbar, a down tube extending rearwardly and obliquely from the head tube, and a joint tube at a rear end of the crossbar;
(b) a rear frame section including two foot pedals, a sprocket wheel having a front axle, a bottom bracket coupled to the foot pedals and front axle of the sprocket wheel, and a chain stay extending rearwardly from the bottom bracket to an axle of a rear wheel,
(c) a sleeve extending forwardly and obliquely from the bottom bracket, the sleeve having an upper end for receiving a lower portion of the down tube therein, the sleeve including at least one longitudinal slit at the upper end thereof and a second quick release for coupling the lower portion of the down tube within the upper end of the sleeve by temporarily deforming the at least one longitudinal slit;
(d) a seat post having a top saddle at an upper portion thereof and a lower portion, the joint tube including an upper end provided with at least one longitudinal slot for receiving the lower portion of the seat post therein, a third quick release for coupling the lower portion of the seat post to the upper end of the joint tube by temporarily deforming the at least one longitudinal slit; and
(e) a seat tube extending upwardly from the bottom bracket and having an upper end provided with an external threaded section, the joint tube including a lower end provided with an annular flange, and a union nut having an internal threaded section for clinging to the flange and threaded engagement with the external threaded section to form a fourth quick release for coupling the lower end of the joint tube with the upper end of the seat tube.

4. The break apart bicycle of claim 3 wherein each of the sleeve and down tubes includes a radial aperture formed therein, and further including a safety pin insertable through the radial apertures for securing the sleeve and down tubes together.

* * * * *